(12) United States Patent
Kuo

(10) Patent No.: US 6,212,969 B1
(45) Date of Patent: Apr. 10, 2001

(54) BRAKE DEVICE FOR SIMULTANEOUSLY ACTUATING TWO BRAKE MECHANISMS

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 0 days.

(21) Appl. No.: 09/503,125

(22) Filed: Feb. 14, 2000

(51) Int. Cl.[7] ................................ F16C 1/18; B62L 3/08
(52) U.S. Cl. ...................... 74/500.5; 74/502.2; 188/19; 188/24.16
(58) Field of Search .................. 74/502.2, 488, 74/489, 480 B, 500.5, 501.5 R; 303/9.61; 188/2 D, 19, 20, 24.16, 24.22

(56) References Cited

U.S. PATENT DOCUMENTS

| | | | |
|---|---|---|---|
| 5,339,929 | * | 8/1994 | Chern ........................... 188/24.16 |
| 5,431,255 | * | 7/1995 | Tsuchie ........................ 188/24.16 |

FOREIGN PATENT DOCUMENTS

| | | | |
|---|---|---|---|
| 0907754 | * | 3/1946 | (FR) ................................ 74/502.2 |
| 424814 | * | 2/1935 | (GB) ................................ 74/500.5 |

* cited by examiner

*Primary Examiner*—Mary Ann Green
(74) *Attorney, Agent, or Firm*—Rosenberg, Klein & Lee

(57) ABSTRACT

A brake device for a walker includes a box having a first rotatable member and second rotatable member rotatably received therein. Each of the first rotatable member and the second rotatable member has a brake cable connected thereto. The first rotatable member has first teeth on an outside thereof and a first curved slot is defined in the first rotatable member. The second rotatable member has second teeth on an outside thereof and a second curved slot is defined in the second rotatable member. The first teeth are engaged with the second teeth. Two operation cables each have an end movably retained in the first/second curved slot, and the other end of each operation cable is connected to respective one of two brake levers. Either one of the brake levers is pulled, the two brake cables are simultaneously actuated.

7 Claims, 5 Drawing Sheets

BRAKE DEVICE FOR SIMULTANEOUSLY ACTUATING TWO BRAKE MECHANISMS

FIELD OF THE INVENTION

The present invention relates to a brake device for a walker. The brake device includes two rotatable members engaged with each other and each rotatable member is connected to a brake cable so that either one of the brake cables is pulled, the two brake cables are actuated.

BACKGROUND OF THE INVENTION

A conventional brake device for a walker which assists disable persons to move generally includes four legs each having a wheel and two handles each having a brake lever connected thereto. The disable persons can hold the two handles and move the walker by the wheels. The walker includes a right side wheel brake mechanism and a left side wheel mechanism. The right side wheel brake mechanism is controlled by one of the brake levers and the left side wheel brake mechanism is controlled by the other brake lever. The right side wheel brake mechanism and the left side wheel brake mechanism allow the disable persons to brake the right wheel or the left wheel in separate actions. However, for a disable person, he/she could be able to use only one hand to operate one of the two brake levers so that it involves a potential dangerous situation that when the walker is moved at a certain speed, only one side wheel is stopped suddenly, the walker could fall or looses its balance.

The present invention intends to provide a brake device that includes two rotatable members engaged with each other. Each rotatable member is connected to a brake cable so that when one of the brake cables is pulled, the other brake cable can also be pulled to let the two brake mechanisms be actuated simultaneously.

SUMMARY OF THE INVENTION

In accordance with one aspect of the present invention, there is provided a brake device comprising a box having a first rotatable member and second rotatable member respectively and rotatably received therein. The first rotatable member has first teeth defined in an outside thereof and a first curved slot is defined in the first rotatable member. The second rotatable member has second teeth defined in an outside thereof and a second curved slot is defined in the second rotatable member. The first teeth are engaged with the second teeth. A first brake cable is connected to the first rotatable member and a second brake cable is connected to the second rotatable member.

A first operation cable has one end connected to a brake lever and the other end of the first operation cable has an end member which is movably received in the first curved slot. A second operation cable has one end connected to the other brake lever, and the other end of the second operation cable has an end member which is movably received in the second curved slot.

The object of the present invention is to provide a brake device of a walker for disable persons, the device has two rotatable members respectively connected to a brake cable so that whichever brake lever is pulled, the two side brake mechanisms are actuated.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
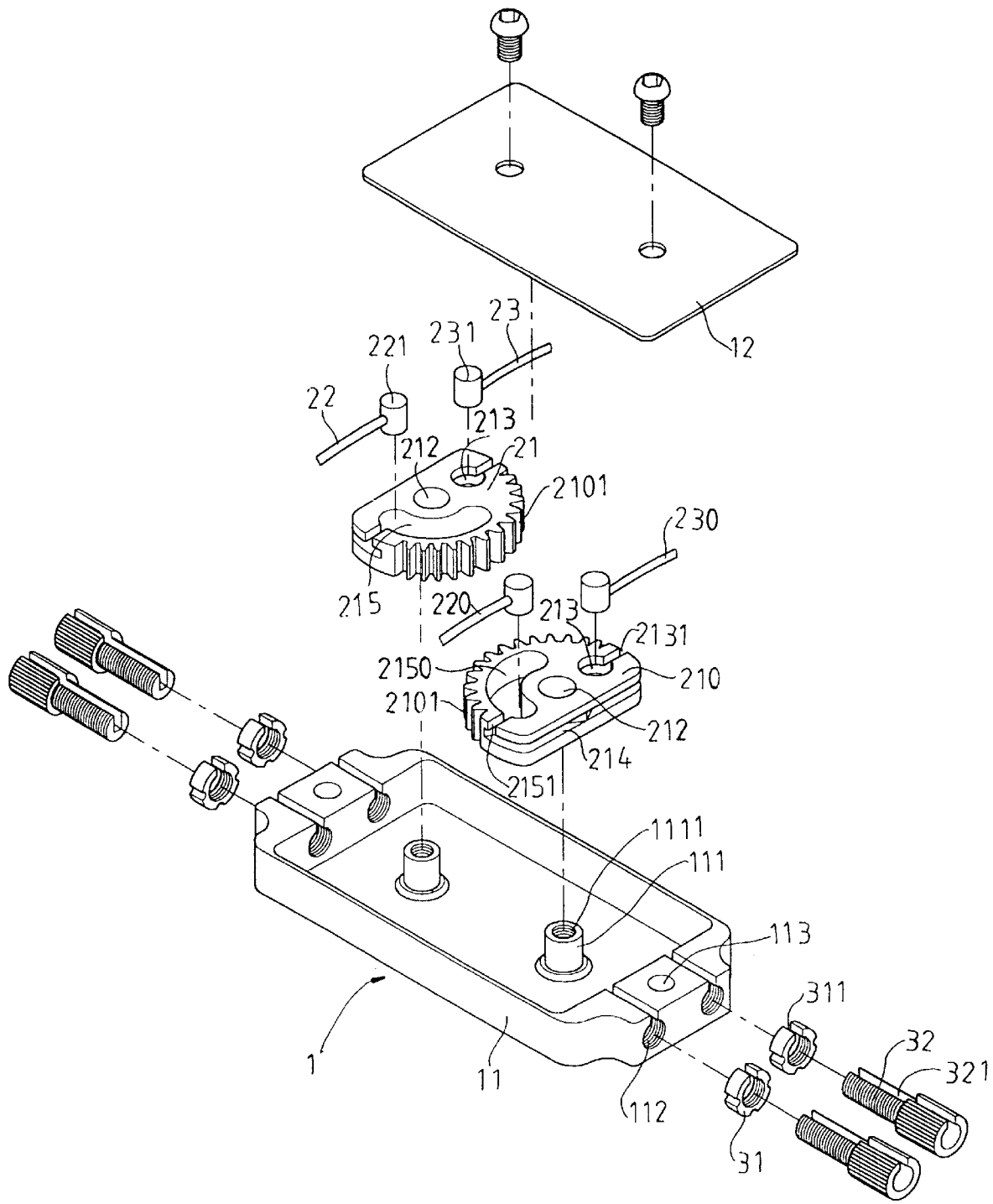
FIG. 1 is an exploded view to show a brake device of the present invention of a walker for disable persons.
Figure 2:
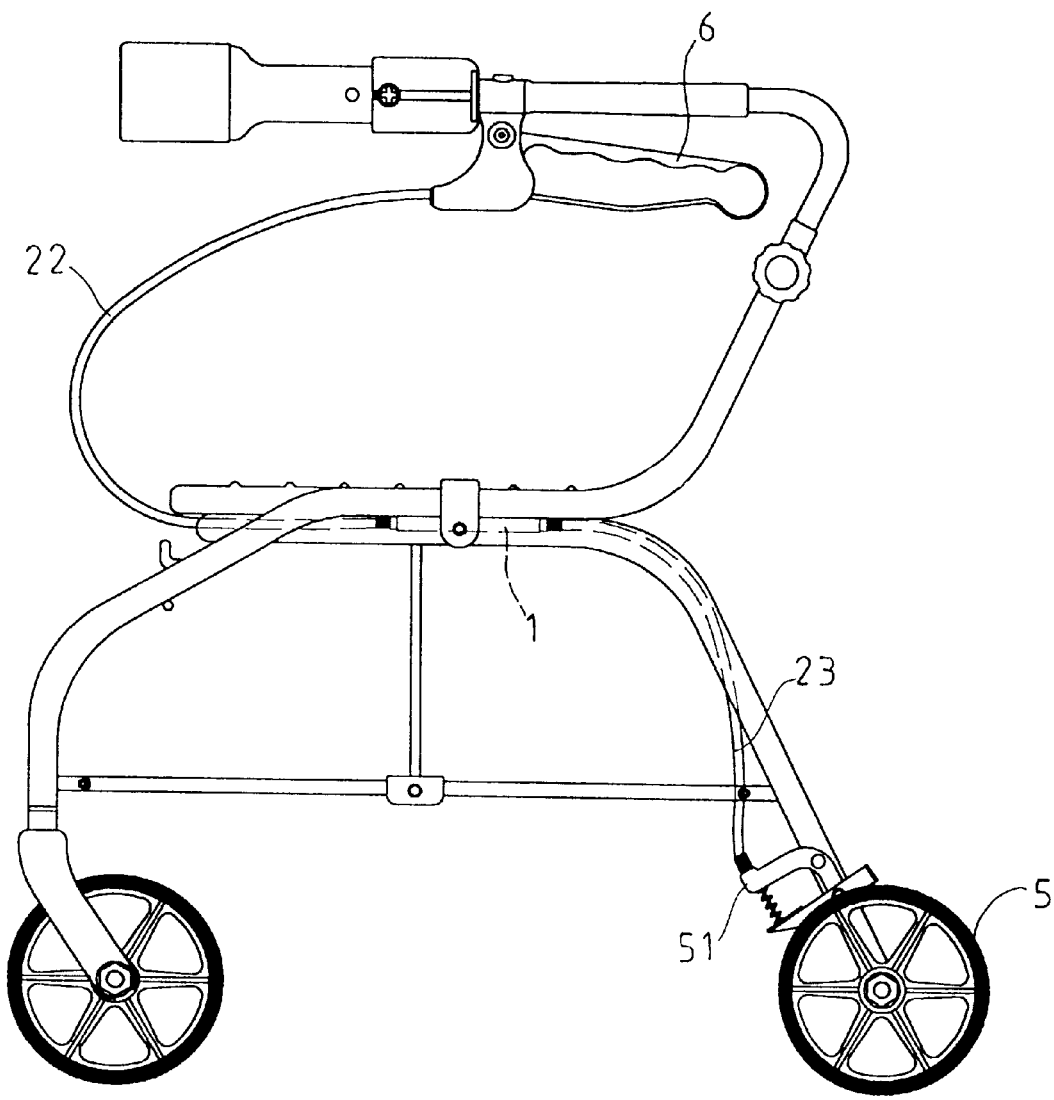
FIG. 2 is an illustrative view to show the brake device on a walker.
Figure 3:
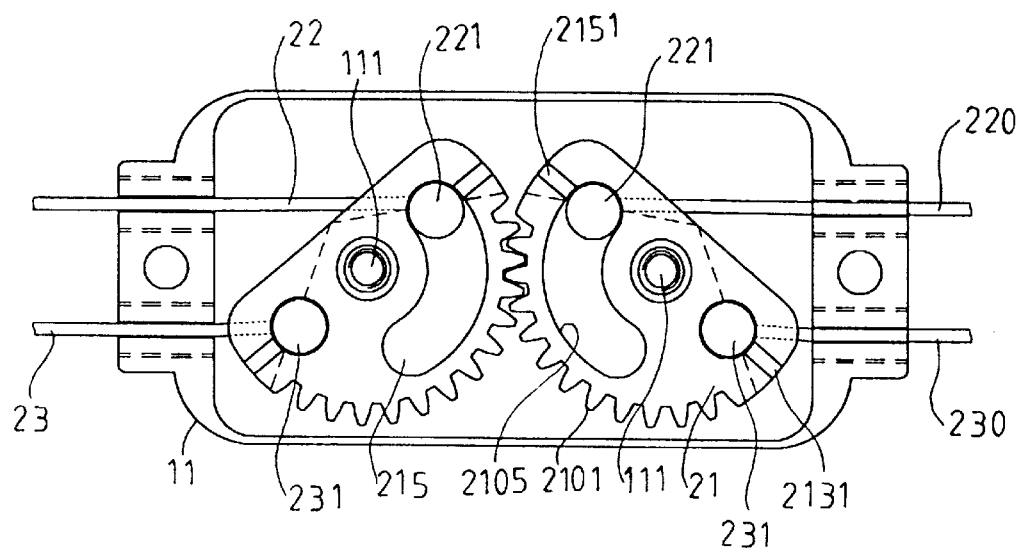
FIG. 3 is an illustrative view to show the brake device when the operation ables are not pulled.

Referring to FIGS. 1 to 3, the brake device in accordance with the present invention comprises a box 1 having sidewalls to enclose a recessed area, two tubes 111 extending from an inside of the box 1. A cover 12 is mounted to the box 1 by two bolts extending through the cover 12 and engaged with the two threaded holes 1111 in the two tubes 111. A first rotatable member 21 and second rotatable member 210 are respectively and rotatably mounted to the two tubes 111 by inserting the two tubes 111 through two respective holes 212, 212 in the two rotatable members 21, 210. The first rotatable member 21 and the second rotatable member 210 each are a semi-circular member and first teeth 211 are defined in the semi-circular periphery of the first rotatable member 21, and second teeth 2101 are defined in the semi-circular periphery of the second rotatable member 210. The first teeth 211 are engaged with the second teeth 2101. A first curved slot 215 is defined in the first rotatable member 21 and a second curved slot 2150 is defined in the second rotatable member 210.

A groove 214 is defined in an end of each of the first rotatable member 21 and the second rotatable member 210. The two grooves 214 respectively communicate with respective one of the first curved slot 215 and the second curved slot 2150. A passage 2151 is defined in a surface of each of the first rotatable member 21 and the second rotatable member 210. The passage 2151 in the first rotatable member 21 communicates with the groove 214 in the first rotatable member 21 and the first curved slot 215. The passage 2151 in the second rotatable member 210 communicates with the groove 214 in the second rotatable member 210 and the second curved slot 215. A first operation cable 22 has one end connected to a brake lever 6 as shown in FIG. 2, and the other end of the first operation cable 22 has an end member 221 which is movably received in the first curved slot 215. A second operation cable 220 has one end connected to the other brake lever, and the other end of the second operation cable 220 has an end member 221 which is movably received in the second curved slot 2150.

Each of the first rotatable member 21 and the second rotatable member 210 has a recess 213 defined therein and located beside the first/second curved slot 215/2150. Another passage 2131 is defined in each of the first rotatable member 21 and the second rotatable member 210 to communicate the recess 213 and the groove 214 in each of the first rotatable member 21 and the second rotatable member 210. Therefore, two brake cables 23, 230 each have an end head 231 received in the recess 213 and the brake cables 23, 230 respectively extend from the grooves 24 in the first rotatable member 21 and the second rotatable member 210 via the passage 2131. The other end of each brake cable 23/230 is connected to a brake mechanism 51 on each side wheel 5 of the walker. The two operation cables 22, 220 respectively extend from the grooves 214 in the first rotatable member 21 and the second rotatable member 210.

Figure 4:
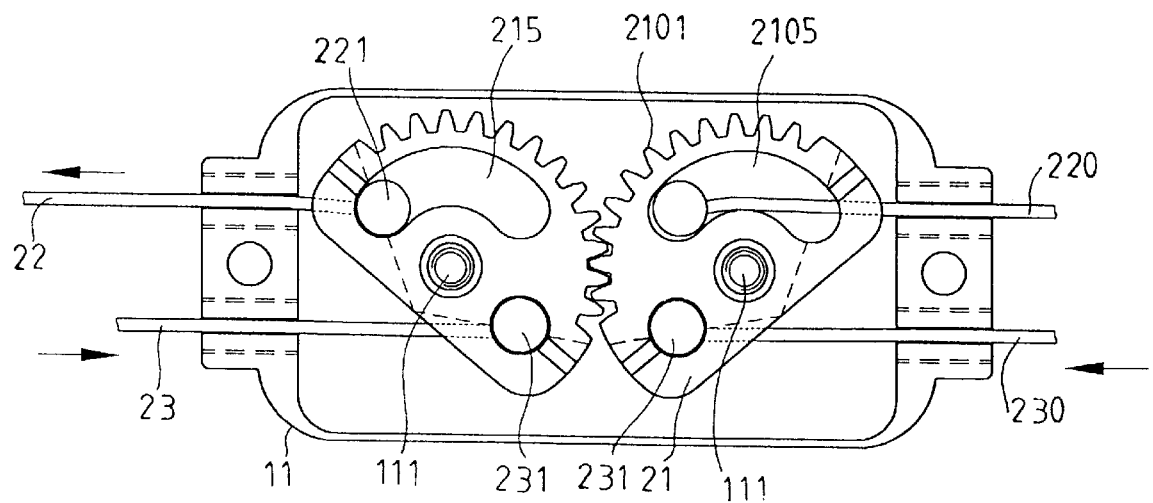
FIG. 4 is an illustrative view to show the brake device when the operation cables are pulled.

Two threaded holes 112 are defined through each one of two ends of the box 1, and two slits are defined in each end of the box 1 and communicate with the two threaded holes 112. The slits are located in alignment with the passages 321 in the bolts 32 so that the brake cables 23, 230 and the operation cables 22, 220 easily pass through the passages 321 in the bolts 32 via the slits. A connection hole 113 is defined in a top of each end of the box 1 and located between the two slits in each end of the box 1 so that the box 1 is easily connected to the walker by the two connection holes 113. Each threaded hole 112 has a bolt 32 cooperated with a nut 31 engaged therewith and each bolt 32 and each nut 31 have a passage 321 defined longitudinally therethrough. Therefore, the operation cable 22/220 and the brake cable 23/230 respectively extend through the threaded holes 112 and the bolts 32. As shown in FIG. 3, when the operation cables 22, 220 are not pulled, the two end members 221 are located in an end of the two respective curved slots 215, 2150, and the two end members 221 are located at a nearest position. When either one of the levers 6 is pulled, as shown in FIG. 4, either one of the first rotatable member 21 and the second rotatable member 210 is pivoted about the tube 111, and because the first teeth 211 are engaged with the second teeth 2101, the first rotatable member 21 and the second rotatable member 210 are both rotated to pull the two brake cables 23, 230 to actuate the two respective brake mechanisms 51 to stop the walker.

Figure 5:
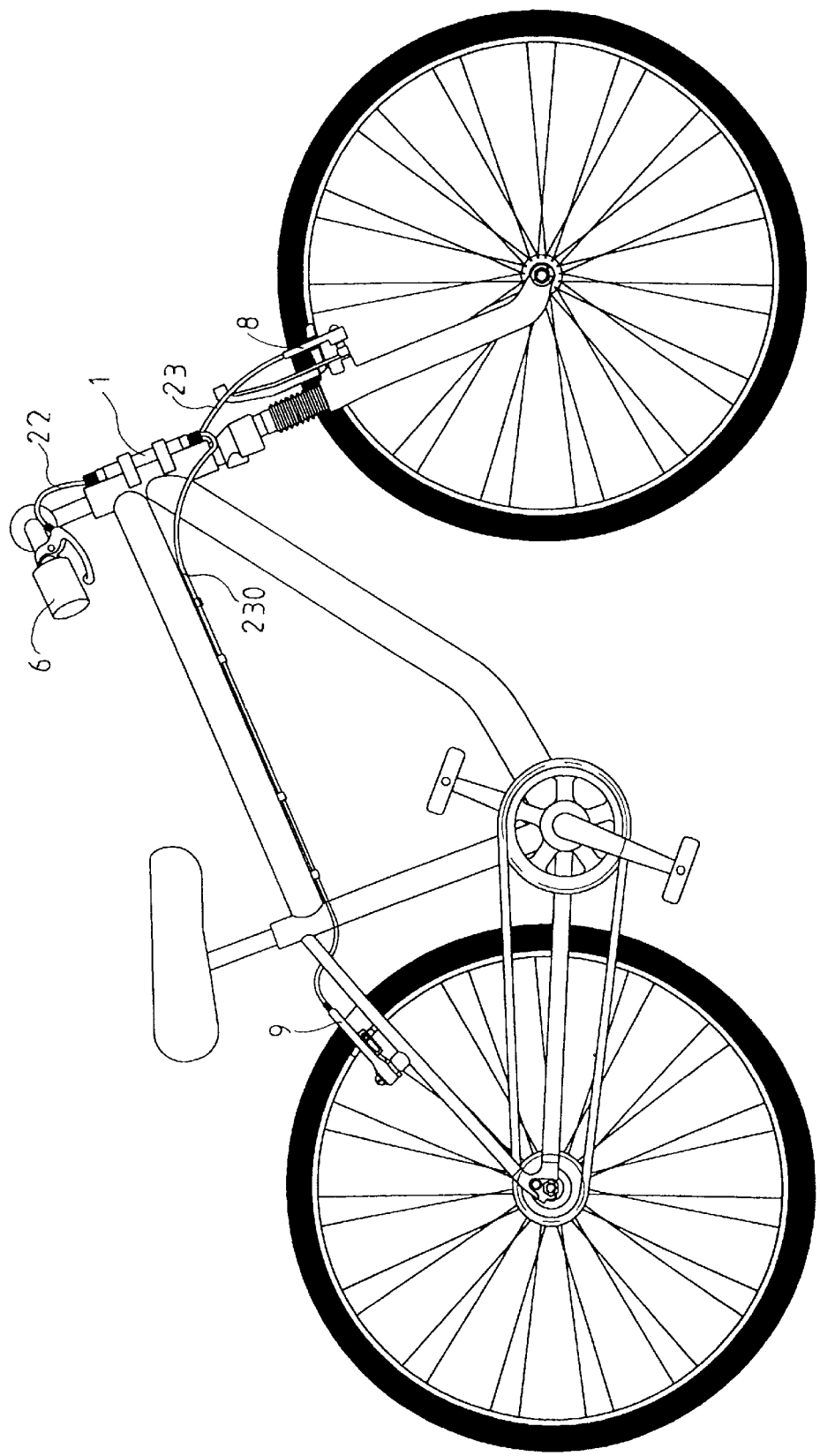
FIG. 5 is an illustrative view to show the brake device of the present invention installed on a bicycle.

FIG. 5 shows the brake device of the present invention can be installed on a bicycle. The operation cable 22 (only one is shown) is connected to the brake lever 6 connected to the handlebar, and the two brake cables 23, 230 are respectively connected to the front brake mechanism 8 and the rear brake mechanism 9.

Figure 6:
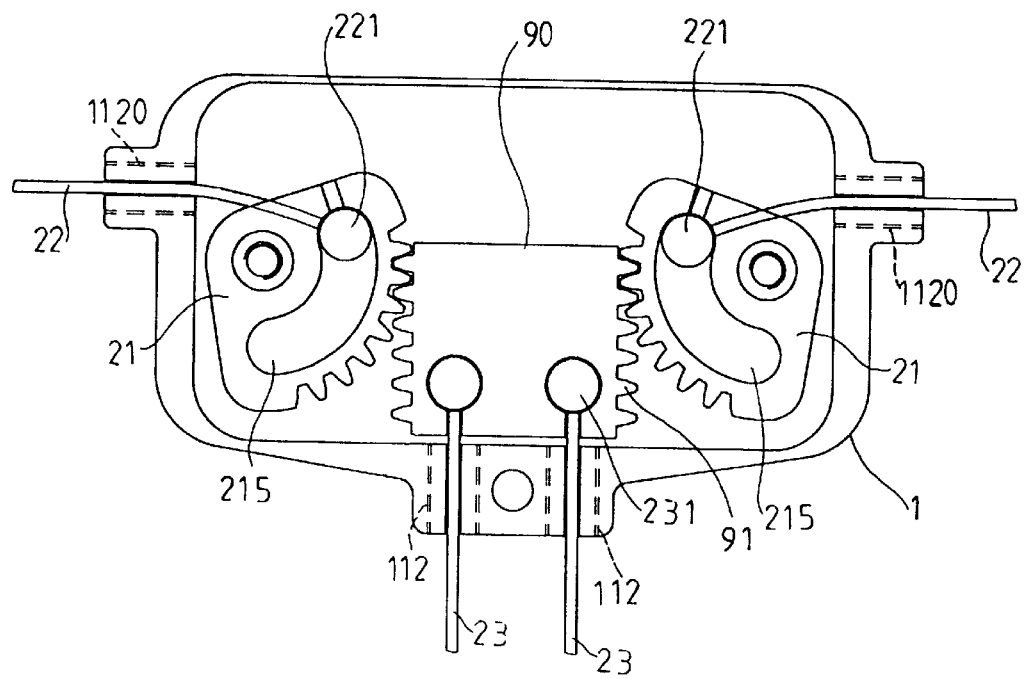
FIG. 6 is an illustrative view to show the other embodiment the brake device when the operation cables are not pulled.
Figure 7:
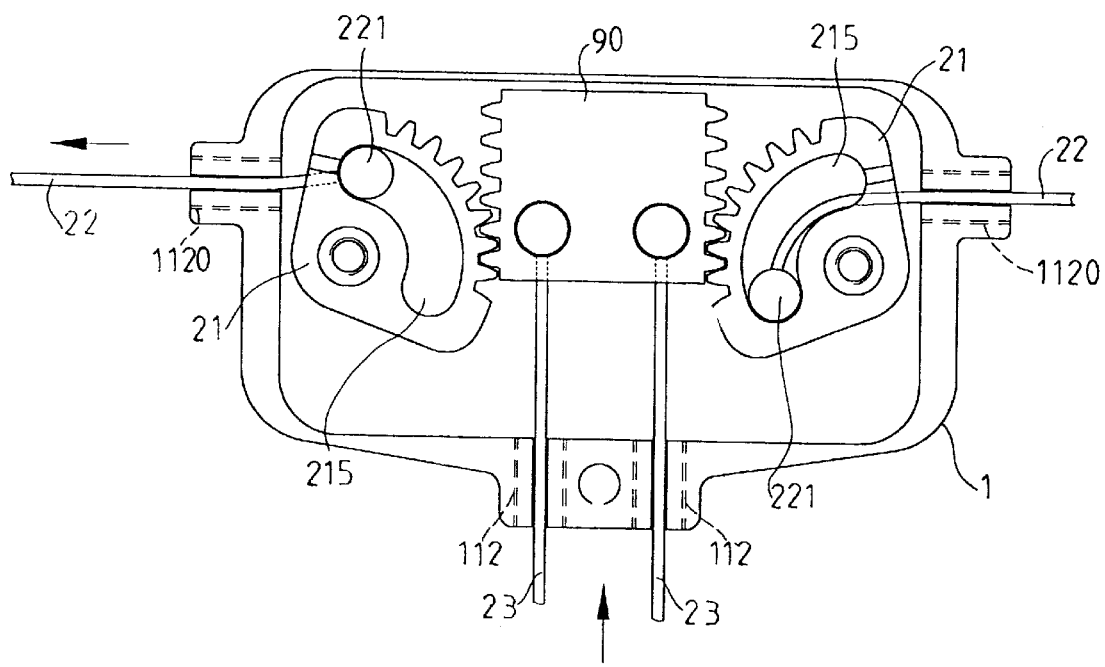
FIG. 7 is an illustrative view to show the other embodiment the brake device when the operation cables are pulled.

FIGS. 6 and 7 show the other embodiment of the brake device of the present invention, wherein the box 1 has two rotatable member 21 rotatably received therein. Each one of the two rotatable members 21 is shaped as a quarter of a circular and has teeth defined in an outside thereof. The teeth of the two rotatable members 21 are engaged with each other. Each one of the two rotatable members 21 has a curved slot 215 defined therein so that two respective operation cables 22 have their end members 221 are respectively and movably retained in the two curved slots 215. The two operation cables 22 respectively extend out from the box 1 via two apertures 1120 in two ends of the box 1.

A transmission member 90 is movably located between the two rotatable members 21 and has third teeth 91 defined in two sides thereof. The third teeth 91 are respectively engaged with the two respective teeth in the two rotatable members 21. Two brake cables 23 are connected to the transmission member 90 and extend from two holes 112 in a side of the box 1. When either one of the operation cables 22 is pulled, the pulled operation cable 22 rotates the rotatable member 22 and the transmission member 90 is moved by the rotation of the rotatable member 22, and the other rotatable member 21 is therefore rotated. The movement of the transmission member 90 pulls the two brake cables 23 to actuate the two brake mechanisms connected to the two brake cables 23.

While we have shown and described various embodiments in accordance with the present invention, it should be clear to those skilled in the art that further embodiments may be made without departing from the scope and spirit of the present invention.

What is claimed is:

1. A brake device comprising:

a box having a first rotatable member and second rotatable member respectively and rotatably received therein, said first rotatable member having first teeth defined in an outside thereof and a first curved slot defined in said first rotatable member, said second rotatable member having second teeth defined in an outside thereof and a second curved slot defined in said second rotatable member, said first teeth engaged with said second teeth, a first brake cable connected to said first rotatable member and a second brake cable connected to said second rotatable member, and a first operation cable having one end adapted to be connected to a brake lever, and the other end of said first operation cable having an end member which is movably received in said first curved slot, a second operation cable having one end adapted to be connected to another brake lever, and the other end of said second operation cable having an end member which is movably received in said second curved slot.

2. The device as claimed in claim 1, wherein a groove is defined in an end of each of said first rotatable member and said second rotatable member, said two grooves respectively communicating with respective one of said first curved slot and said second curved slot, a passage defined in a surface of each of said first rotatable member and said second rotatable member, said passage in said first rotatable member communicating with said groove in said first rotatable member and said first curved slot, said passage in said second rotatable member communicating with said groove in said second rotatable member and said second curved slot.

3. The device as claimed in claim 1 further comprising two tubes extending from an inside of said box, said first rotatable member and said second rotatable member respectively mounted to said two tubes.

4. The device as claimed in claim 1 further comprising two threaded holes defined through each one of two ends of said box, each threaded hole having a bolt engaged therewith and each bolt having a passage defined longitudinally therethrough.

5. The device as claimed in claim 4 further comprising two slits defined in each end of said box and said two slits communicating with said two threaded holes in each end of said box, said slits located in alignment with said passages in said bolts.

6. The device as claimed in claim 1 further comprising a connection hole defined in a top of each end of said box.

7. The device as claimed in claim 1, wherein each of said first rotatable member and said second rotatable member is a semi-circular member.

* * * * *